United States Patent
Castelli et al.

(10) Patent No.: US 10,274,063 B2
(45) Date of Patent: Apr. 30, 2019

(54) SECONDARY DRIVE COUPLING FOR USE WITH A SHAFT

(71) Applicant: Thomson Industries, Inc., Wood Dale, IL (US)

(72) Inventors: Peter Castelli, Patchogue, NY (US); Anthony Giannetto, Centereach, NY (US)

(73) Assignee: Thomson Industries, Inc., Marengo, IL (US)

(*) Notice: Subject to any disclaimer, the term of this patent is extended or adjusted under 35 U.S.C. 154(b) by 392 days.

(21) Appl. No.: 14/934,374

(22) Filed: Nov. 6, 2015

(65) Prior Publication Data

US 2017/0002906 A1 Jan. 5, 2017

Related U.S. Application Data (60) Provisional application No. 62/187,360, filed on Jul. 1, 2015.

(51) Int. Cl.
*F16H 25/00* (2006.01)
*F16H 25/24* (2006.01)
(Continued)

(52) U.S. Cl.
CPC ..... *F16H 25/2427* (2013.01); *F16H 25/2021* (2013.01); *F16H 25/24* (2013.01); *F16H 25/2204* (2013.01); *F16H 2025/2075* (2013.01)

(58) Field of Classification Search
CPC .. F16H 25/2427; F16H 25/24; F16H 25/2021; F16H 2025/2075; F16H 25/2204
See application file for complete search history.

(56) References Cited

U.S. PATENT DOCUMENTS

| | | | |
|---|---|---|---|
| 4,452,254 A * | 6/1984 | Goldberg | A61N 1/0573 607/127 |
| 5,295,406 A * | 3/1994 | Alfano | F16H 25/2204 74/89.39 |

(Continued)

FOREIGN PATENT DOCUMENTS

| | | |
|---|---|---|
| EP | 0259641 A1 | 3/1988 |
| EP | 0632181 A1 | 1/1995 |

OTHER PUBLICATIONS

European Search Report for European Application No. 16167858.6, dated Feb. 21, 2017, 8 pages.

*Primary Examiner* — Victor L MacArthur
(74) *Attorney, Agent, or Firm* — Moreno IP Law LLC (57) ABSTRACT

A secondary drive coupling may comprise at least one coupling member having a first mating portion and a second mating portion. The first mating portion is configured to engage a first section of a shaft on one side of a region of weakness of the shaft, whereas the second mating portion is configured to engage a second section of the shaft on an axially opposite side of the region of weakness. Both the first mating portion and the second mating portion are each configured to prevent rotation of the at least one coupling member about the shaft. In another embodiment, the at least one coupling member comprises a first coupling member comprising the first mating portion and a first contact surface and a separate, second coupling member comprising a second mating portion and a second contact surface that is configured to engage the first contact surface.

10 Claims, 7 Drawing Sheets

(51) Int. Cl.
*F16H 25/20* (2006.01)
*F16H 25/22* (2006.01)

(56) References Cited

U.S. PATENT DOCUMENTS

| | | | |
|---|---|---|---|
| 6,401,557 B1 * | 6/2002 | Davies | F02K 1/763 |
| | | | 192/141 |
| 7,443,121 B2 * | 10/2008 | Nagai | F16H 25/2021 |
| | | | 310/80 |
| 9,446,787 B2 * | 9/2016 | Asakura | F16H 25/2204 |
| 2013/0283947 A1 * | 10/2013 | Yamada | F16H 25/2021 |
| | | | 74/89.23 |
| 2015/0003906 A1 | 1/2015 | Johnson | |

* cited by examiner

- Prior Art -
FIG. 1

- Prior Art -

SECONDARY DRIVE COUPLING FOR USE WITH A SHAFT

CROSS-REFERENCE TO RELATED APPLICATION

The instant application claims the benefit of Provisional U.S. Patent Application Ser. No. 62/187,360 entitled "Secondary Drive Coupling" and filed Jul. 1, 2015, the teachings of which are incorporated herein by this reference.

FIELD

The instant disclosure relates generally to rotating shafts and, in particular, to secondary drive coupling for use with such shafts, including linear actuation systems incorporating such shafts.

BACKGROUND

Rotating shafts in mechanical systems have myriad applications. For example, in the field of linear actuators, so called ball or lead screws may be used in conjunction with a ball or lead nut. In use, a prime mover (typically a motor) is connected to the ball or lead screw by means of a coupling. A corresponding ball or lead nut is mounted onto the screw but is prevented from rotating by virtue of an anti-rotation feature associated with the nut. Because the nut is captive and prevented from rotating, rotation of the screw causes linear motion of the nut along a longitudinal axis of the screw and, consequently, the linear actuator. Generally, the friction between the ball or lead screw and the corresponding nut is designed to be as low as possible in order to reduce the energy needed to induce the linear motion, which in turn permits the use of less powerful (and costly) prime movers.

Figure 1:
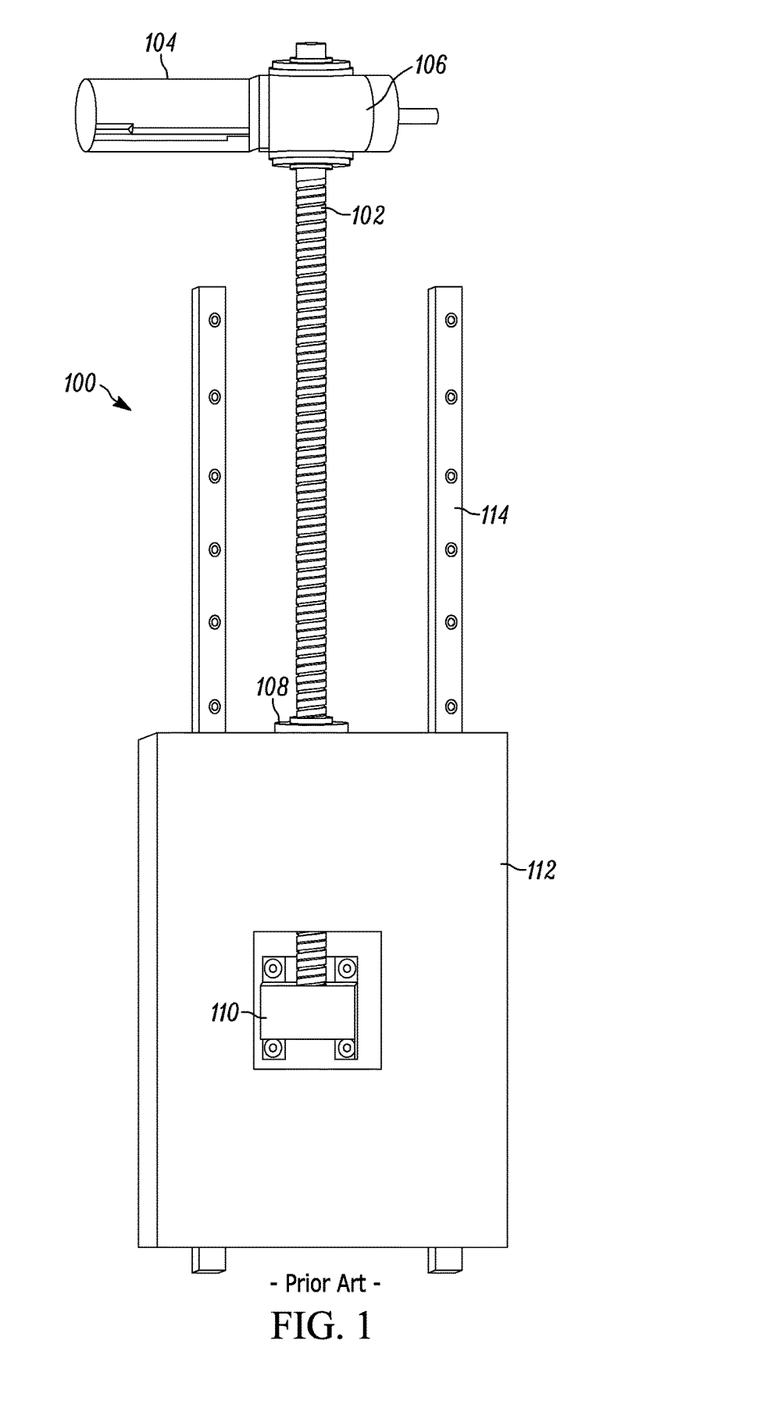
FIG. 1 illustrates a linear actuator system in accordance with prior art techniques.

FIG. 1 illustrates a typical use of a linear actuator. In particular, the linear actuator system 100 comprises a ball or lead screw 102 operatively connected to a prime mover or motor 104 via, in this case, an intervening worm gear box 106. The combination of a the motor 104 and/or gear box 106 may be considered a rotational drive source for the ball or lead screw 102. A ball or lead nut 108 may be mounted on the ball or lead screw 102 and connected to a load platen 112. As further shown, the vertically-oriented ball or lead screw 102 may be supported by a bearing 110 (illustrated in FIG. 1 through a partial cut-away view of the load platen 112) such that substantially all axial forces applied to the ball or lead screw 102 (through presence of a load) are borne by the bearing 110, as known in the art. The load platen 112, in turn, is maintained in alignment with the ball or lead screw 102, and may travel vertically under the guidance of, guide rails 114 that are typically mounted on a suitable wall or other support structure (not shown). Rotation of the ball or lead screw 102 causes linear translation of the ball or lead nut 108 that, in turn, induces vertical movement of the load platen 112. Any suitably sized load (not shown) to be moved vertically may be operatively coupled to the load platen 112.

Often, the low-friction relationship between the ball or lead screw 102 and the nut 108 may give rise to so-called "back driving" where a force applied by the load to the screw 102 via the nut 108 causes unwanted rotation of the screw (in a direction opposite the rotation provided by the rotational drive source) and linear displacement of the nut 108 and, consequently, the load. However, in applications such as that illustrated in FIG. 1, the low efficiency provided by the gear box 106 prevents back driving of the screw 102, i.e., the gear box 106 effectively serves as a brake against rotation of the screw 102 when the screw 102 is not otherwise being driven by the motor 104.

Figure 2:
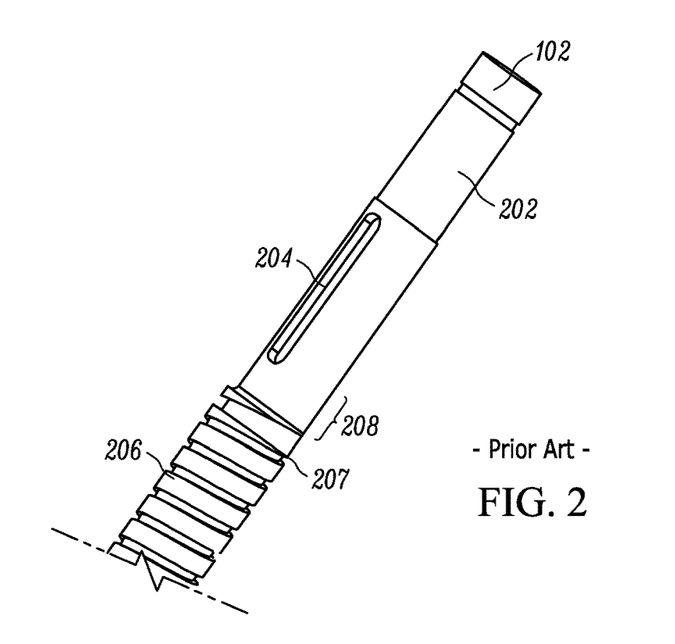
FIG. 2 illustrates a ball or lead screw from a linear actuator in accordance with prior art techniques.

FIG. 2 illustrates a typical prior art ball or lead screw 102 of the type used in the system 100 of FIG. 1. More particularly, the ball or lead screw 102 comprises an input journal 202 through which a rotational drive source may be operatively connected to the ball or lead screw 102. The input journal 202 may comprise a keyway 204 configured to receive a key (not shown) used to secure the ball or lead screw 102 to the rotational drive source. The input journal 202 transitions to a threaded region having a thread form 206 formed therein, beginning with a terminal portion 207 of the thread form 206. As known, the ball or lead nut 108 complementarily mates with the thread form 206. The input journal 202 has a reduced diameter relative to the threaded region, and the transitional region 208 between the keyway 204 of the input journal 202 and the threaded region is a known stress concentration area that is susceptible to failure, e.g., torsional fracture or shear. In the event of a failure within such a region of weakness, the support provided to the ball or lead screw 102 by the bearing 110, along with the maintenance of the load platen 112 by the guide rails 114, will typically prevent the load from immediately dropping. However, because the screw is no longer coupled to the gear box 106, such a failure may permit back driving of the threaded region of the screw 102 and movement of the load (i.e., dropping under the force of gravity), potentially with catastrophic results.

Thus, it would be advantageous to provide solutions to the above-described shortcomings.

SUMMARY

The instant disclosure describes a secondary drive coupling for use with a rotating shaft having a known region of weakness in which at least one coupling member is provided having a first mating portion and a second mating portion. The first mating portion is configured to engage a first section of the shaft on one side of the region of weakness, whereas the second mating portion is configured to engage a second section of the shaft on an axially opposite side of the region of weakness. Both the first mating portion and the second mating portion are each configured to prevent rotation of the at least one coupling member about the shaft. In an embodiment where the shaft comprises a ball or lead screw in which the first section is an input journal and the second section is a threaded region, the at least one coupling member may be implemented as a wire coil having a first and second end. In this embodiment, the first end of the wire coil may comprise the first mating portion and be configured to engage a keyway formed in the input journal, whereas the second end of the wire coil may comprise the second mating portion that is configured to complementarily mate with a thread form of the threaded region. Further still, in this embodiment, the at least one coupling member may further comprise a collar configured to surround at least a portion of the wire coil when the second end of the wire coil is mated with the thread form.

In another embodiment, the at least one coupling member comprises a first coupling member and a separate, second coupling member, wherein the first coupling member comprises the first mating portion and a first contact surface and the second coupling member comprises the second mating portion and a second contact surface that is configured to engage the first contact surface. In this embodiment, either or both of the first contact surface and the second contact surface is configured to extend axially toward the region of weakness. The first contact surface and the second contact surface may be configured such that the first and second coupling members are permitted to rotate relative to each other prior to engagement of the first and second contact surfaces. Once again, in this embodiment, the shaft may comprise a ball or lead screw in which the first section is an input journal and the second section is a threaded region. In this case, the first mating portion of the first coupling member may be configured to engage a keyway formed in the input journal, and the first coupling member may further extend axially along the ball or lead screw past the region of weakness. The first contact surface in this embodiment may comprise a projection on an end of the first coupling member opposite an end of the first coupling member engaging the keyway. The second mating portion of the second coupling member in this embodiment may be configured to engage a thread form of the threaded region, and may be further configured to engage a terminal portion of the thread form. Additionally, in this embodiment, the second coupling member may comprise a split collar or closed collar. Furthermore, the second contact surface in this case may comprises an axially extending surface formed on the second coupling member. Alternatively, the second coupling member may comprise a wire coil configured to complementarily mate with the thread form of the threaded region and a collar configured to surround at least a portion of the wire coil when the wire coil is mated with the thread form.

Linear actuators comprising the instant secondary drive couplings are further disclosed.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 3:
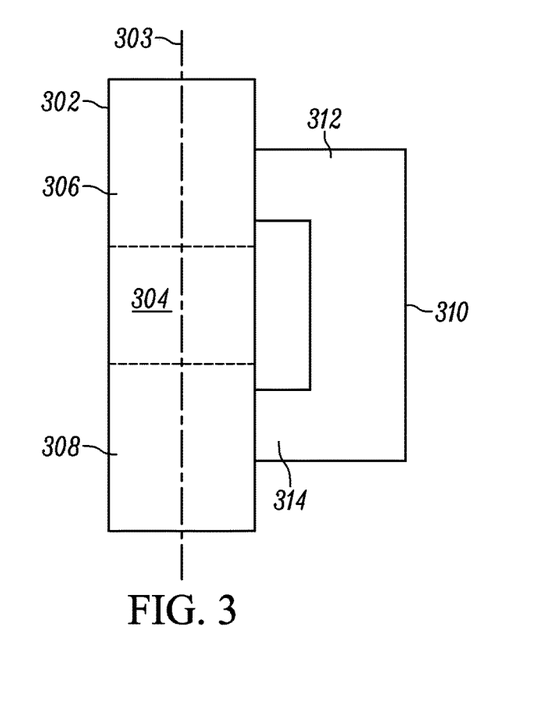
FIG. 3 is a schematic illustration of a secondary drive coupling comprising at least one coupling member operatively connected to a shaft in accordance with the instant disclosure.

Various embodiments of secondary drive couplings that may be incorporated into a linear actuator system of the type described above relative to FIGS. 1 and 2 are described hereinbelow. Referring now to FIG. 3, a secondary drive coupling comprising at least one coupling member 310 operatively connected to a shaft 302 is schematically illustrated. The shaft 302 rotates about its longitudinal axis 303 and further comprises a known region of weakness 304. As described above, the region of weakness 304 is a likely point of failure when the shaft 302 is rotated. The shaft further comprises a first section 306 and a second section 308 on opposite sides of the region of weakness 304. It is noted that, though a single region of weakness 304 is illustrated in FIG. 3, it is possible for a given shaft 302 to comprise more than one such region, and additional instances of the secondary drive coupling embodiments described herein may be applied to such additional regions. In various embodiments described herein, the shaft 302 may comprise a ball or lead screw as known in the art. However, those having skill in the art will appreciate that the instant disclosure is not limited in this regard. In those instances where the shaft 302 does comprise a ball or lead screw, the first section may comprise an input journal and the second section may comprise a threaded region, as described above relative to FIG. 2.

In the embodiment illustrated in FIG. 3, the at least one coupling member 310 comprises a unitary body of substantially rigid material, e.g., any suitable metal. In particular, the material used to implement the at least one coupling member 310 should be selected and/or configured such that the at least one coupling member is capable of at least enduring a maximum torsional load that may result from potential back driving of the shaft 302, particularly its second section 308, in the event of a failure at the region of weakness 304. As shown, the coupling member 310 comprises first and second mating portions 312, 314 configured to engage the corresponding first and second sections 306, 308 of the shaft 302. More specifically, each of the first and second mating portions 312, 314 is configured such that, when mated with its corresponding section 306, 308, the mating portion prevents rotation of the coupling member 310 about the shaft. Stated another way, the first and second mating portions 306, 308 substantially prevent rotation (subject to manufacturing tolerances and strength limits of the materials employed) of the coupling member 310 about the longitudinal axis 303 of the shaft. In the event of a failure of the shaft 302 within the region of weakness 304, the unitary body of the coupling member 310 operates to nevertheless couple the now-separated first and second sections 306, 308 of the shaft such that relative rotation of the second section 308 independent of the first section 306 is prevented or at least substantially minimized.

Figure 4:
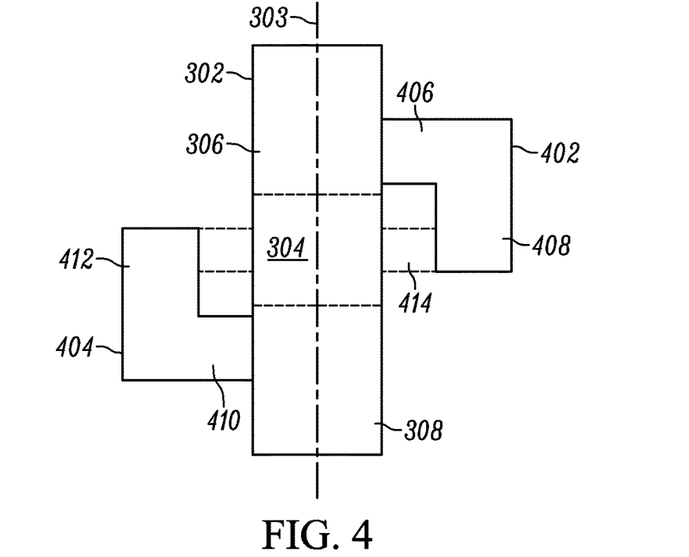
FIG. 4 is a schematic illustration of a secondary drive coupling comprising first and second coupling members operatively connected to a shaft in accordance with the instant disclosure.

Referring now to FIG. 4, a secondary drive coupling comprising a first coupling member 402 and a separate, second coupling member 404 operatively connected to the shaft 302 is schematically illustrated. In this embodiment, the first coupling member 402 comprises a first mating portion 406 as well as a first contact surface 408. Likewise, the second coupling member 404 comprises a second mating portion 410 and a second contact surface 412 that is configured to engage the first contact surface 408. As in the embodiment of FIG. 3, the first mating portion 406 is configured such that, when mated with the corresponding first section 306 of the shaft 302, the first mating portion 406 prevents rotation of the first coupling member 402 about the shaft 302. Likewise, the second mating portion 410 is configured such that, when mated with the corresponding second section 308 of the shaft 302, the second mating portion 410 prevents rotation of the second coupling member 404 about the shaft 302. Further still, as in the embodiment of FIG. 3, the materials used to implement the first and second coupling members 402, 404 are selected and/or configured such that the at first and second coupling members are capable of at least enduring a maximum torsional load that may result from potential back driving of the shaft 302 in the event of a failure at the region of weakness 304.

The configuration of the first and second contact surfaces 408, 412 to engage each other is schematically illustrated in FIG. 4 by an overlap 414 between the two contact surfaces 408, 412. In the embodiment illustrated in FIG. 4, both the first and second contact surfaces 408, 412 extend axially along the longitudinal length of the shaft 302 toward the region of weakness 304, thereby establishing the overlap 414. However, in practice, it is not necessary for both of the contact surfaces 408, 412 to extend toward the region of weakness 304 in this manner. More particularly, one or the other of the first and second contact surfaces 408, 412 may axially extend entirely past the region of weakness 304 in order to create the overlap 414 with the non- (or lesser-) extending contact surface.

Regardless, in the embodiment of FIG. 4, failure of the shaft 302 within the region of weakness 304 allows the first and second coupling members 402, 404, engaged with the now-separated first and second sections 306, 308 of the shaft, to rotate relative to each other about the longitudinal axis 303 until the first and second contact surfaces 408, 412 come into contact with each other, thereby preventing further rotation. In this manner, once again, the relative rotation of the second section 308 independent of the first section 306 is prevented or at least substantially minimized. An aspect of the embodiment of FIG. 4, is that the relative rotational angular separation between the first and second contact surfaces 408, 412 may be selected such that less than a full rotation of the second section 308 of the now-failed shaft 303 is permitted relative to the first section 306 before the first and second contact surfaces 408, 412 engage each other. Such controlled rotation of the second section 308 of the shaft 302 may be useful in detecting the occurrence of the shaft failure.

For example, and with further reference to FIG. 1, it is known in the art to include both a rotational sensor and a linear displacement sensor (not shown) within the system 100. In particular, the rotational sensor is deployed such that it is capable of measuring rotations of the screw 102 at the point where the screw 102 engages the rotational drive source. Concurrently, the linear displacement sensor is deployed such that it is capable of measuring linear displacement of the ball or lead nut 108 (or, equally, the load platen 112 or load). Given knowledge of the characteristics of the ball or lead screw 102, a known number of rotations of the screw 102 should correlate to a known linear displacement of the nut 108. However, in the event of a failure of the screw 102 as described above, a certain amount of linear displacement of the nut 108 will occur (due to back driving of the second section 308 of the screw 102) prior to the engagement of the first and second contact surfaces 408, 412 without the simultaneous occurrence of the normally corresponding rotations detected by the rotational sensor, i.e., the rotations at the rotational sensor are "lost." Detection of this lost rotational motion can then be used as an indicator of the failure of the screw 102 that can, in turn, be used to generate an operator alert as to the existence of the failure condition. Various implementations permitting such lost motion are described in further detail below.

It is noted that, while the illustrations in FIGS. 1, 3 and 4 (as well as the various implementations described below relative to FIGS. 5-12) depict the shaft 302 or screw 102 in a substantially vertical orientation, this is not a limiting factor as to the applicability of the various embodiments of the presently described secondary drive coupling. In particular, the secondary drive coupling embodiments described herein may be applied to any situation (whether the relevant shaft is aligned precisely vertically, horizontally or at some other angle therebetween) in which axial movement of the shaft is prevented (i.e., there is a bearing on the non-driven end of the screw) and in which uncontrolled linear displacement of the load is possible absent the secondary drive coupling.

Figure 5:
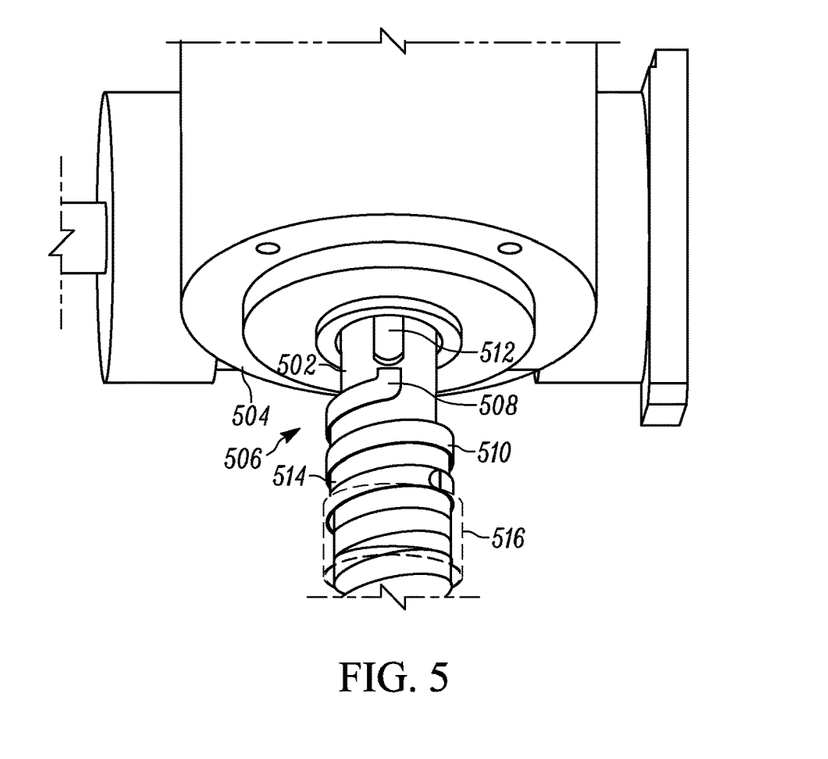
FIG. 5 illustrates a first implementation of the embodiment of FIG. 3 in accordance with the instant disclosure.

Referring now to FIG. 5, a first implementation of the embodiment of FIG. 3 is further illustrated. In this implementation, the coupling member 310 of FIG. 3 comprises a wire coil 506 that engages a screw 502 having substantially similar construction as the screw 102 illustrated in FIG. 2. The wire coil 506, which may be formed of any suitable material as described above has a first end 508 and a second end 510. More particularly, the first end 508 comprises the first mating portion 312 configured, in the illustrated embodiment, to engage a keyway (not shown) formed in an input journal of a ball or lead screw 502. Note that the rotational drive source 504 is depicted in a partially displaced position relative to its normal deployment in order to view the second end 510 of the coil 506. (FIG. 5 also illustrates the use of a key 512 that, as known in the art, engages the keyway in the screw 502 and a corresponding keyway or notch in the rotational drive source 504 thereby rotationally coupling the screw 502 to the rotational drive source 504.) The second end 510 of the coil 506 is configured to complementarily mate with the thread form 514 of the screw 502. As shown, the pitch of the thread form 514 is fairly large and configured to accommodate, in this case, a ball nut. Consequently, the coil 506 has a substantially hemispherical cross-section having a diameter (width) that substantially matches the width of the ball conforming groove/thread. In the event that the screw 502 fails as described above, engagement of the first end 508 of the coil 506 with the keyway and engagement of the second end 510 of the coil 506 with the thread form 514 permits the coil 506 to stop or minimize the uncontrolled rotation of the threaded region of the screw 502. The coupling member 310 may further comprise a collar 516 that is configured to surround at least a portion of the wire coil 506 when the wire coil 506 is mated with the thread form 514 (shown in FIG. 5 displaced from its normal deployment position substantially covering the second end 510 in order to better view the interaction of the second end 510 and the thread form 514).

Figure 6:
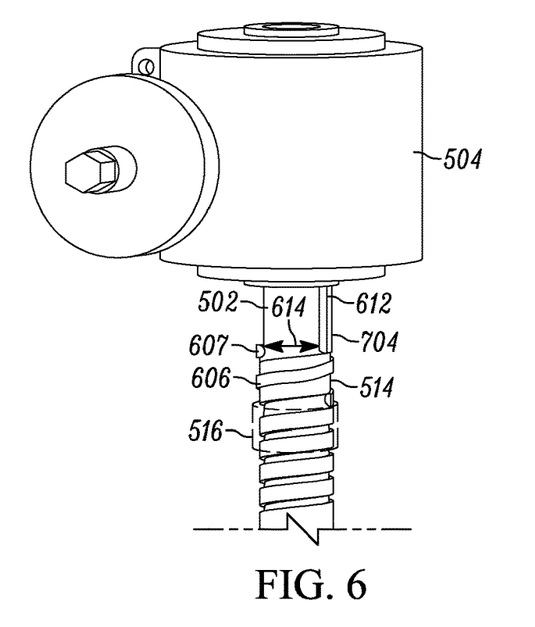
FIGS. 6 and 7 illustrate a first implementation of the embodiment of FIG. 4 in accordance with the instant disclosure.
Figure 7:
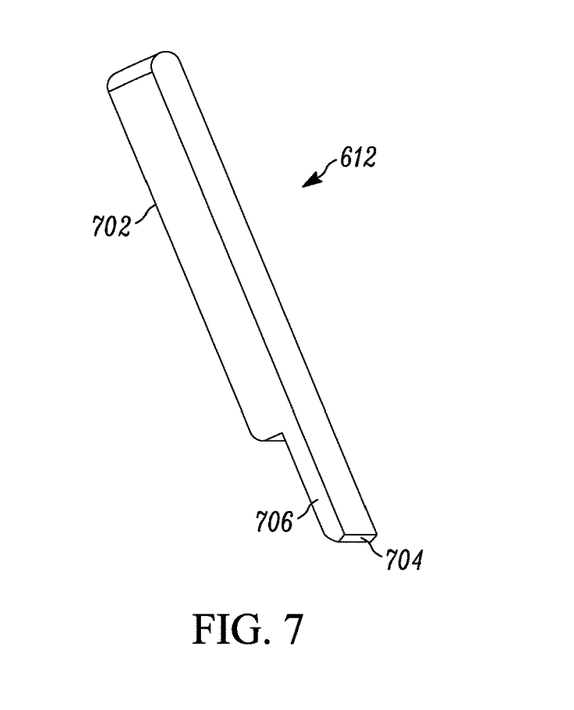

Referring now to FIGS. 6 and 7, a first implementation of the embodiment of FIG. 4 is further illustrated. As shown in FIG. 6, the implementation once again includes the screw 502 and rotational drive source 504 of FIG. 5. However, in this implementation, the first coupling member 402 is embodied by an extended key 612 whereas the second coupling member 404 is embodied by a wire coil 606. As best shown in FIG. 7, the extended key 612 comprises a first mating portion 702 configured to complementarily engage a keyway formed in an input journal (not shown in FIG. 6) of the screw 502. Additionally, the extended key 612 comprises an extension 704 that, as best shown in FIG. 6, axially extends along the screw 502 toward the region of weakness between the screw's input journal and threaded region, as described above. Further, in this implementation, the wire coil 606 itself, substantially similar to the second end 510 of the coil 506 illustrated in FIG. 5, constitutes the second mating portion and is configured to complementarily mate with the thread form 514 of the threaded region. However, unlike the coil 506 of FIG. 5, the wire coil 606 shown in FIG. 6 does not extend in the direction of the region of weakness. In this embodiment, a lateral surface 706 of the extension 704 serves as the first contact surface 408, whereas an end 607 of the wire coil 606 serves as the second contact surface 412. In this case, the lateral surface 706 extends across the region of weakness to establish an overlap with the end 607 of the wire coil 606. In the illustrated example, a range of lost motion 614, as described above, results from angular separation between end 607 of the wire coil 606 and the lateral surface 706 of the extended key 612.

Figure 8:
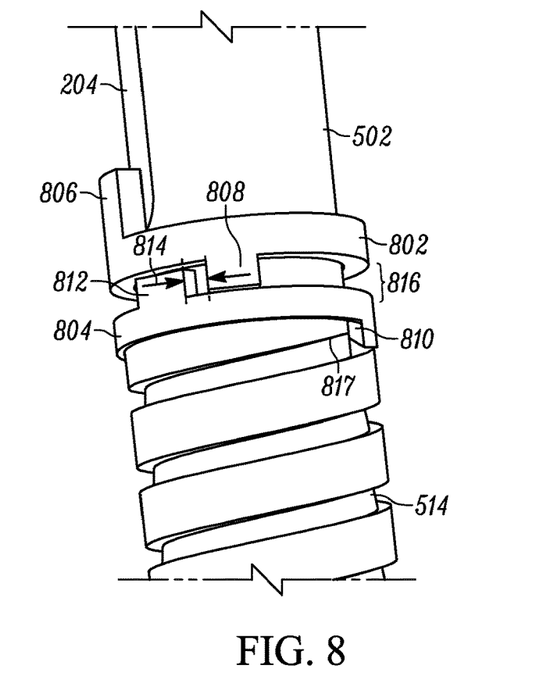
FIG. 8 illustrates a second implementation of the embodiment of FIG. 4 in accordance with the instant disclosure.

Referring now to FIG. 8, a second implementation of the embodiment of FIG. 4 is further illustrated. In this embodiment, both the first coupling member 802 and second coupling member 804 take the form of collars that engage the separate sections of the screw 502, as described above. The collars 802, 804 may be split collars or clamps that initially fit loosely over the screw 502 and that may be subsequently tightened by virtue of a clamping screw or the like (not shown in FIG. 8). Alternatively, either or both of the collars may comprise closed collars establishing a force fit with the corresponding portion of the screw, or that are otherwise engaged with their respective sections of the screw 502. For example, in the illustrated example, the first coupling member 802 comprises a first mating portion 806 in the form of an axially-extending projection configured to complementarily engage a keyway 204 formed in the screw 502, as described above. On the other hand, the second coupling member 804 comprises a second mating portion 810 in the form of an axially-extending surface configured to contact a terminal portion 817 of the thread form 514 such that the second coupling member 804 is prevented from rotating about the screw 502. Further in this example, both the first and second coupling members 802, 804 comprises respective first and second contact surfaces 808, 812 in the form of tabs axially extending toward the region of weakness 816. In the implementation of FIG. 8, the tabs 808, 812 have substantially the same axial length though, once again, this is not a requirement so long as they overlap. Further, a range of lost motion 814 may be established by the angular separation between the first and second contact surfaces 808, 812.

Figure 9:
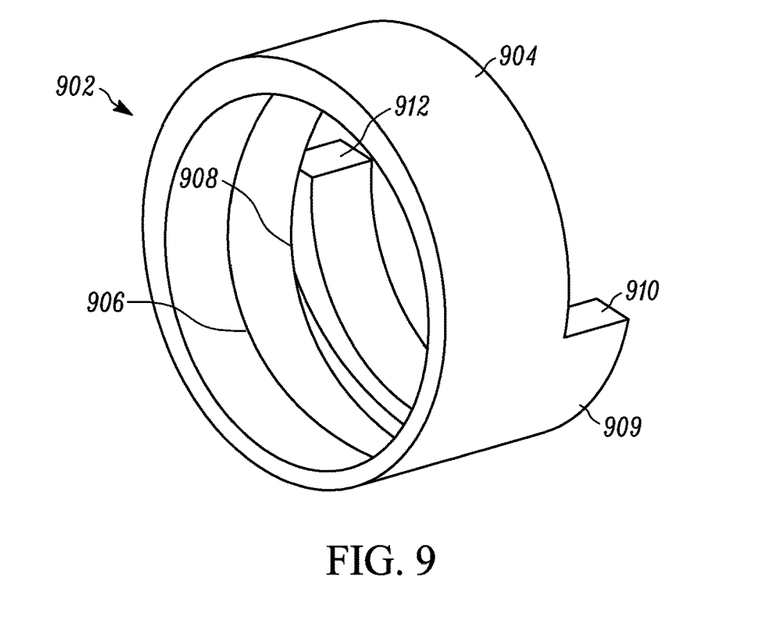
FIGS. 9 and 10 illustrate a third implementation of the embodiment of FIG. 4 in accordance with the instant disclosure.
Figure 10:
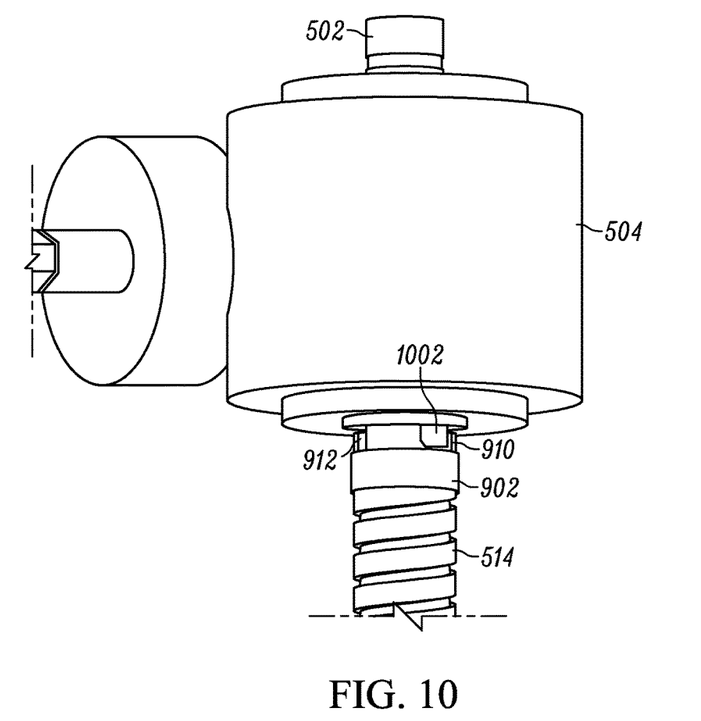

Referring now to FIGS. 9 and 10, a third implementation of the embodiment of FIG. 4 is further illustrated. In this embodiment, and as best shown in FIG. 10, the first coupling member 1002 is substantially identical in structure and deployment as the extended key 612 described above relative to FIG. 7. However, in this case, the second coupling member 902 is formed as a closed collar 904 having an internal thread form 906 disposed on its inner surface, which internal thread form 906 is formed to complementarily mate with the thread form 514 of the screw 502. In particular, a terminal portion 908 of the internal thread form 906 is configured to mate with and contact the terminal portion (not shown) of the thread form 514 of the screw 502 so that, once again, the second coupling member 902 is prevented from rotating about the screw 502. Second contact surfaces 910, 912 are formed on a raised or extended portion 909 of the second coupling member 902 as axially-extending surfaces toward the region of weakness. In the illustrated example, the second contact surfaces 910, 912 are formed substantially 180 degrees apart from each other, though the distance between the second contact surfaces 910, 912 may be selected as a matter of design choice. By positioning the first coupling member 1002 at an angular position between the second contact surfaces 910, 912, a range of lost motion may once again be provided.

Figure 11:
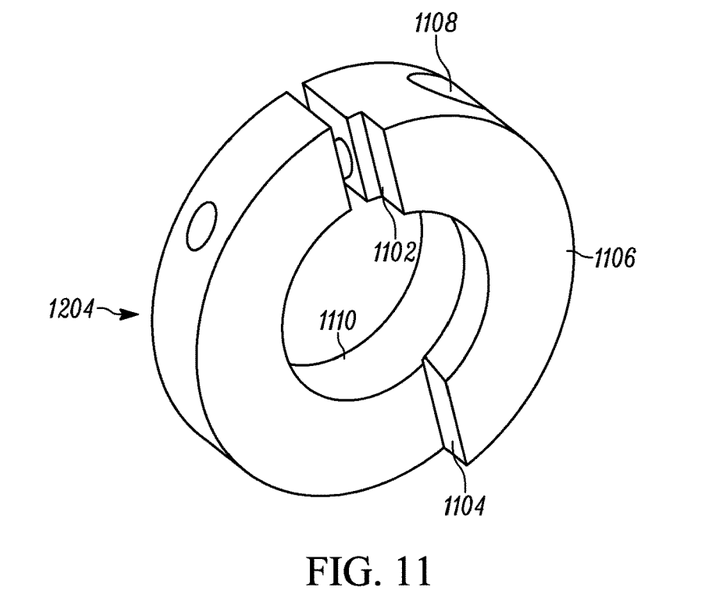
FIGS. 11 and 12 illustrate a fourth implementation of the embodiment of FIG. 4 in accordance with the instant disclosure.
Figure 12:
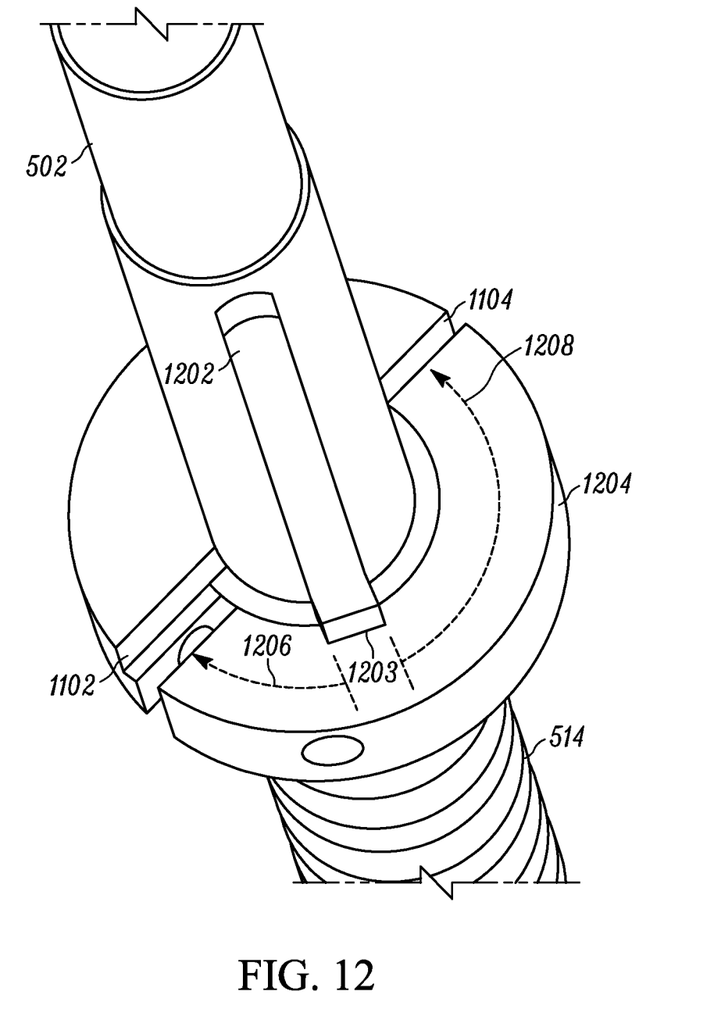

Referring now to FIGS. 11 and 12, a fourth implementation of the embodiment of FIG. 4 is further illustrated. In this embodiment, as best shown in FIG. 12, the first coupling member 1202 is once again substantially identical in structure and deployment as the extended key 612 described above relative to FIG. 7, with the exception that it includes a radially extending projection 1203 at an end of the first coupling member 1202 opposite an end of the first coupling member 1202 engaging the keyway (not shown). In the illustrated embodiment, the projection 1203 terminates the distal tip of the extension of the first coupling member 1202 in proximity to the terminal portion of the thread form 514, i.e., in the direction of and past the region of weakness. As further shown, the second coupling member 1204 in this embodiment comprises a split collar configured to be mounted at the terminal portion of the thread form 514. A threaded passage 1108 is provided in the split collar and is configured to receive a clamping screw (not shown) such that the split collar 1204 may be rigidly mounted on the screw 502, i.e., such that the split collar 1204 is prevented from rotating about the screw 502. In the illustrated embodiment, the second contact member 1204 comprises a substantially smooth internal surface 1102. However, this is not a requirement and it may be desirable in some instances to provide an internal thread form that is configured to complementarily mate with the thread form 514 of the screw 502.

As best shown in FIG. 11, the second coupling member 1204 comprises second contact surfaces in the form of axially extending surfaces 1102, 1104 formed on a raised or extended portion 1106 of the second coupling member 1204. The second contact surfaces 1102, 1104 are configured to extend axially a sufficient distance toward the region of weakness (when the second coupling member 1204 is mounted on the screw 502) to ensure overlap with the projection 1203 of the first coupling member 1202. Likewise, the projection 1203 establishes a surface area sufficient to ensure contact with the second contact surfaces 1102, 1104. Once again, in the illustrated example, the second contact surfaces 1102, 1104 are formed substantially 180 degrees apart from each other, though the particular angular distance between them may be selected as a matter of design choice. By positioning the first coupling member 1202 at an angular position between the second contact surfaces 1102, 1104, a range of lost motion 1206, 1208 may once again be provided. Furthermore, in the event of a failure of the screw 502 at the region of weakness, the radially extending projection 1203 prevents the escape of the input journal portion of the screw 502 to the extent that the interlocking nature of the keyway and the first coupling member 1202 would cause the projection 1203 to engage the gearbox (not shown in FIG. 11) if the input journal begins to slide out of the gearbox.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A secondary coupling system comprising:
a ball or lead screw having a region of weakness and first and second sections on axially opposite sides of the region of weakness, wherein the first section is a portion of an input journal of the ball or lead screw, the input journal comprising a keyway, and the second section is a portion of a threaded region of the ball or lead screw, the threaded region comprising a thread form;
a first coupling member comprising a first mating portion engaging the keyway and substantially preventing rotation of the first coupling member about the ball or lead screw, the first coupling member comprising a first contact surface extending along a longitudinal axis of the ball or lead screw toward the region of weakness; and
a second coupling member comprising a second mating portion engaging the thread form and substantially preventing rotation of the second coupling member about the ball or lead screw, the second coupling member comprising a second contact surface extending along the longitudinal axis of the ball or lead screw toward the region of weakness, extent of the first contact surface along the longitudinal axis of the ball or lead screw overlapping extent of the second contact surface along the longitudinal axis of the ball or lead screw,
wherein contact between the first contact surface and the second contact surface at least minimizes rotation of the second section of the ball or lead screw independent of the first section of the ball or lead screw in the event of failure of the ball or lead screw within the region of weakness.

2. The secondary coupling of claim 1, wherein the first contact surface and the second contact surface are configured to permit relative rotation of the first coupling member to the second coupling member prior to engagement of the first contact surface and the second contact surface.

3. The secondary coupling of claim 1, wherein the first coupling member extends axially along the ball or lead screw from the keyway past the region of weakness.

4. The secondary coupling of claim 1, wherein the first contact surface comprises a projection formed on an end of the first coupling member opposite an end of the first coupling member engaging the keyway.

5. The secondary coupling of claim 1, the thread form comprising a terminal portion thereof, wherein the second mating portion of the second coupling member engages the terminal portion of the thread.

6. The secondary coupling of claim 1, wherein the second coupling member is a split collar.

7. The secondary coupling of claim 1, wherein the second coupling member is a closed collar.

8. The secondary coupling of claim 1, wherein the second coupling member further comprises:
a wire coil complementarily mating with the thread form; and
a collar surrounding at least a portion of the wire coil when the wire coil is mated with the thread form.

9. The secondary coupling of claim 1, wherein the second contact surface comprises an axially extending surface formed on the second coupling member.

10. A linear actuator system comprising:
the secondary coupling system of claim 1; and
a rotational drive source operatively connected to the input journal.

* * * * *